Aug. 20, 1963 J. W. TAYLOR 3,101,408
IONIZING RADIATION DETECTOR OF THE SCINTILLATION PHOTOCONDUCTIVE TYPE
Filed Jan. 18, 1961
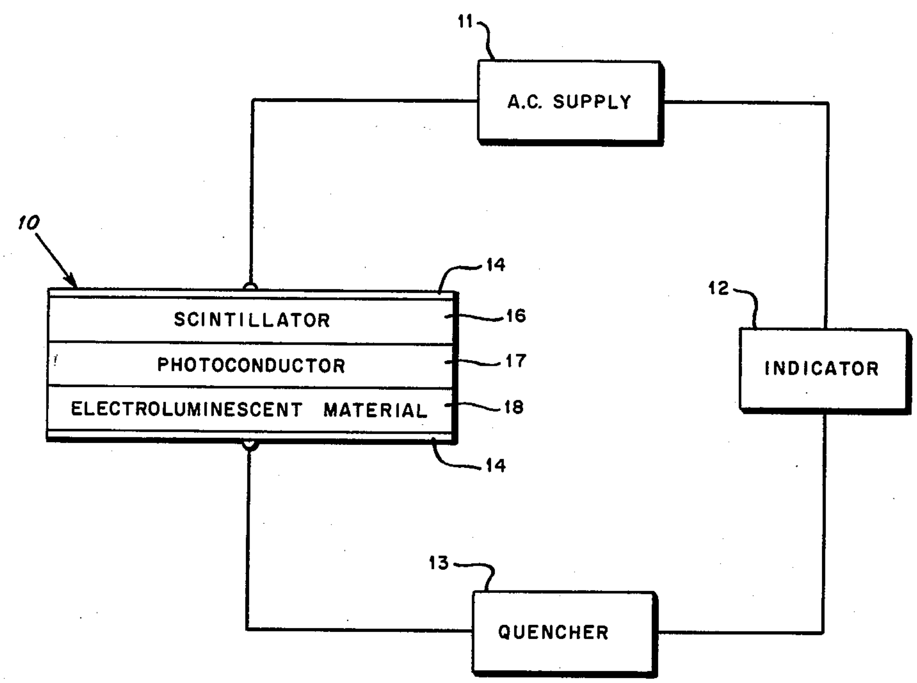
*INVENTOR.*
JOHN W. TAYLOR
*BY*
ATTORNEY United States Patent Office 3,101,408
Patented Aug. 20, 1963

3,101,408

IONIZING RADIATION DETECTOR OF THE SCINTILLATION PHOTOCONDUCTIVE TYPE

John W. Taylor, Philadelphia, Pa., assignor to the United States of America as represented by the Secretary of the Navy Filed Jan. 18, 1961, Ser. No. 83,596
6 Claims. (Cl. 250—71.5)
(Granted under Title 35, U.S. Code (1952), sec. 266)

The invention described herein may be manufactured and used by or for the Government of the United States of America for governmental purposes without the payment of any royalties thereon or therefor.

The present invention relates to apparatus for detecting and indicating ionizing radiation and more particularly to a direct-reading device responsive to ionizing radiation and adaptable for either personnel or area monitoring.

The presence of radiant energy in both military and industrial environments has become increasingly more common in certain technological activities. Conversely, the number of persons engaged in such activities has also multiplied. Although ionization occurring from radiant energy produces biological effects of diagnostic and therapeutic value, exposures above prescribed tolerance levels are also injurious. The invisible ionizing radiation penetrating the body of a person causes no pain yet without warning can cause severe injury. Therefore, the quantity of ionizing radiation must be measured to warn the person when conditions of radioactivity exceed a certain safety level.

Ionizing radiation detectors are generally classified either for personnel use or for area monitoring. The personnel type is usually inexpensive, and portable such as the pocket ionization chamber, pocket-type or pendant-type dosimeters and film badges. The area monitoring type is usually expensive and of more sophisticated construction for better accuracy and reliability such as portable and mounted ionization chamber-type and scintillation-type detectors. It is thus notable that there were no personnel ionizing radiation detectors heretofore available which embodies the accuracy and reliability of the area monitoring type at a relatively low cost.

Even if cost and size were of no moment, the conventional ionizing radiation detectors remain unsuitable in certain environments such as strong magnetic and radio frequency fields, such as generated in radar apparatus where there is also ionizing X-radiation. For instance, the conventional scintillation-type detector has its emission to a first dynode of a photo-multiplier and requires a stabilized high voltage direct current supply, and is commonly regarded as an extremely delicate instrument and will be degraded in operation by the pressure of extraneous magnetic and radio frequency fields. Some ionization chamber-types are perhaps slightly less costly and more rugged, but they are not deemed sensitive to the extent required for human safety.

It is a general purpose of the present invention to satisfy the need for an ionizing radiation detector having all of the advantages of the known types of detectors at a cost commensurate with good business practice.

It is, therefore, an object of the present invention to provide an improved device for detecting and indicating ionizing radiation having an extremely high sensitivity relative to existing devices, which is light and compact so that it can be easily carried about by a person engaged in ordinary activities, which is of rugged construction, which is insensitive to strong magnetic and radio frequency fields, and which requires no direct current regulated voltage for its operation.

It is another object of the invention to provide an improved device for detecting and indicating ionizing radiation which will be relatively inexpensive, simple, compact, convenient and practical.

Various other objects and advantages will appear from the following description of one embodiment of the invention, and the most novel features will be particularly pointed out hereinafter in connection with the appended claims.

The accompanying drawing diagrammatically represents an ionizing radiation detecting and indicating device of the present invention.

In the illustrated embodiment of the invention, a detecting head indicated generally by the numeral 10, an alternating current electrical supply 11, an indicator 12, and a quencher 13 are connected in series to form a closed circuit. The order of their connection is not restricted to the particular embodiment illustrated.

The detecting head 10 has its electrical terminals connected to two electrically conductive opaque plates 14 which are maintained separated from and in fixed relation to each other by a combination of three distinct materials which may be formed as adjacent layers, as a homogeneous mixture, or in any other convenient manner. For convenience of illustration the three materials are shown in distinct layers. The three materials are a scintillation material 16, a photoconductive material 17, and a electroluminescent material 18. The photoconductive material 17 is a composition, such as cadmium sulphide (CdS), or a mixture which can produce a large change in impedance with only a slight change in light intensity at a given wavelength. The wavelength, however, should be prescribed in the spectral regions in which the scintillation material 16 and electroluminescent material 18 generate maximum light emission.

The scintillation material 16 is of a composition, such as activated zinc sulphide (ZnS), or a mixture which can convert ionizing radiation into light frequencies in the spectral region in which the photoconductive material 17 is most sensitive. The light so produced from a single radiation event appears as a flash or scintillation in crystals located inside the scintillation material, the intensity being proportional to the energy of the radiation.

The electroluminescent material 18 is comprised of a composition, such as activated zinc selenide (ZnSe), or a mixture characterized by the property of emitting light in the spectral region to which the photoconductive material 17 is most responsive when it is subjected to an electric field.

It is contemplated that an electroluminescent material or photoconductive material, capable of performing the functions of the scintillation material 17, may obviate the need for the latter. It should thus be apparent that it is not intended to limit the inventive concept to the particular materials selected to obtain the three separate and distinct functions as set forth above.

The alternating current supply 11 produces an excitation at a selected voltage and a frequency whereby a maximum light output of the electroluminescent material 18 will occur in the most sensitive spectral region of the photoconductive material 17 with only a slight decrease in resistance across the plates 14. For the illustrated embodiment, best results were obtained with an excitation of 300 volts, at 10 kilocycles.

The indicator 12 can be any direct-reading type of device which is responsive to pulsating current in the closed series circuit, ranging from simply a neon light to a pulse counter. The quencher 13 may be of any well known circuit design such as a degenerative feedback amplifier, a high resistance, or a combination thereof. The quencher 13 functions to change itself from a state of conduction to one of cut-off when undergoing a rapid upward change in voltage. The large resistant type will serve for this purpose at low pulse or counting rates, while a degenerative feedback amplifier is desirable for higher pulse or counting rates.

The operation of the device is summarized as follows. In the operative condition of being ready to detect and indicate ionizing radiation, the detecting head 10 is subjected to an electric field from the alternating current supply 11. However, the relatively high resistance of the detecting head 10 determines a current below the threshold current required to generate a feedback light signal from the electroluminescent material 18 to the photoconductive material 17; hence the detecting head 10 is considered to be in a nonconducting state. When the detecting head 10 is then exposed to ionizing radiation of either a particulate or electromagnetic character, the scintillation material 16 converts the energy to light in the spectral region at which the photoconductive material 17 is most sensitive. The light so produced substantially reduces the impedance of the photoconductive material 17 causing thereby a substantial increase in current, above the threshold current, through the detecting head 10 in the series circuit as generated at the alternating current supply 11. This current will cause the electroluminescent material 18 to glow and emit light in the same spectral region. Feedback of this light to the photoconductive material 17 will result in a greater current which, in turn, generates more light from the electroluminescent material 18, until the whole cell is glowing and in a conducting state. The alternating current supply 11 having an output such as 300 volts, 10 kilocycles, maintains the electric field between the electrode plates 14. At a prescribed instant, as determined by the quencher 13, the conduction is cut off and the detecting head 10 is restored to its original nonconducting state. Obviously, the time constant of the quencher 13 determines the maximum pulse or counting rate at which the detecting head 10 will respond.

It is thus apparent that a single event of ionizing radiant energy imparted to the detecting head 10 produces an avalanche of electron multiplication by the interaction of the scintillation material 16, the photoconductive material 17, and the electroluminescent material 18, until the multiplication reaches the maximum level determined by the quencher 13. Each event causes a pulse at the indicator 12, and the number of pulses per unit of time is indicative of the counting rate of ionizing radiation.

The advantages of the ionizing radiation detector and indicator of the present invention are distinct over existing methods and apparatus in both construction and functions. The device can be made in any convenient size, and provides a sensitivity of from 40 to 400 times that of heretofore existing devices. The device is also insensitive to strong magnetic and radio frequency fields, making it useful as a warning device for X-ray coming from radar transmitters or other electronic gear.

It is understood that the materials and apparatus used and their particular arrangement with respect to each, hereinabove disclosed, are for illustrative purposes only and are not intended to limit the scope of the invention to these precise materials and apparatus.

It will be further understood that various changes of the details, materials, steps and arrangement of parts, which have been herein described and illustrated in order to explain the nature of the invention, may be made by those skilled in the art within the principle and scope of the invention as expressed in the appended claims.

What is claimed is:

1. Apparatus for detecting and indicating ionizing radiation comprising, in combination: a normally nonconductive detecting head having scintillation, photoconductive, and electroluminescent materials disposed between a pair of conducting plates; an alternating current supply; an indicator responsive to current flow; a quencher adapted to stop current flow therethrough at a predetermined value; and an electrical conductor means connecting said detecting head, said alternating current supply, said indicator and said quencher in series to form a closed circuit; whereby said detecting head conducts a current through said circuit when it is subjected to ionizing radiation.

2. Apparatus for detecting and indicating ionizing radiation comprising, in combination: a normally nonconductive detecting head having the properties of scintillation, photoconduction, and electroluminescence disposed between a pair of conducting plates; an alternating current supply; an indicator responsive to current flow; a quencher adapted to stop current flow therethrough at a predetermined value; and an electrical conductor means connecting said detecting head, said alternating current supply, said indicator and said quencher in series to form a closed circuit; whereby said detecting head conducts through said circuit when it is subjected to ionizing radiation.

3. Apparatus for detecting and indicating ionizing radiation comprising, in combination: a normally nonconductive detecting head having a photoconductive material maximally responsive in a prescribed spectral region of light, a scintillation material maximally generative of light in said spectral region, and an electroluminescent material maximally generative of light in said spectral region disposed between a pair of conducting plates; an alternating current supply; an indicator responsive to current flow; a quencher adapted to stop current flow therethrough at a predetermined value; and an electrical conductor means connecting said detecting head, said alternating current supply, said indicator and said quencher in series to form a closed circuit; whereby said detecting head conducts a current through said circuit when it is subjected to ionizing radiation.

4. Apparatus for detecting and indicating ionizing radiation comprising, in combination: a normally nonconductive detecting head having the properties of being maximally conductive in a prescribed spectral region of light, maximally generative of light in said spectral region in response to ionizing radiation, and maximally generative of light in said spectral region in response to an electric field disposed between a pair of conducting plates; an alternating current supply; an indicator responsive to current flow; a quencher adapted to stop current flow therethrough at a predetermined value; and an electrical conductor means connecting said detecting head, said alternating current supply, said indicator and said quencher in series to form a closed circuit; whereby said detecting head conducts a current through said circuit when it is subjected to ionizing radiation.

5. Apparatus responsive to ionizing radiation comprising: a photoconductive material maximally responsive in a prescribed spectral region of light, a scintillation material maximally generative of light in said spectral region, and an electroluminescent material maximally generative of light in said spectral region disposed between a pair of conducting plates; whereby the impedance of said detecting head rapidly decreases when it is subjected to ionizing radiation.

6. Apparatus responsive to ionizing radiation comprising: an outer layer scintillation material, an inner photoconductive material, and an outer layer of electroluminescent material, said outer layers being disposed between a pair of conducting plates; means applying A.C. voltage across said pair of conducting plates whereby said detecting head conducts a current therethrough when it is subjected to ionizing radiation.

References Cited in the file of this patent

UNITED STATES PATENTS

| | | |
|---|---|---|
| 2,837,661 | Orthuber et al. | June 3, 1958 |
| 2,899,560 | Nemet | Aug. 11, 1959 |
| 2,986,635 | Schultz | May 30, 1961 |